United States Patent
Sakata

(10) Patent No.: US 6,583,970 B1
(45) Date of Patent: Jun. 24, 2003

(54) MAGNETORESISTIVE HEAD DEVICE INCORPORATING JOINTS BETWEEN MAGNETORESISTIVE LAYER AND SENSE CURRENT CONDUCTORS

(75) Inventor: Hiromi Sakata, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/538,945

(22) Filed: Mar. 31, 2000

(30) Foreign Application Priority Data

Aug. 31, 1999 (JP) .......................................... 11-246165

(51) Int. Cl.[7] .............................................. G11B 5/127
(52) U.S. Cl. .................................................. 360/324.12
(58) Field of Search ................................. 360/113, 324, 360/324.1, 324.11, 324.12, 326, 322, 320, 327.32

(56) References Cited

U.S. PATENT DOCUMENTS

| 5,371,643 A | * | 12/1994 | Yuito et al. ................. | 360/113 |
| 5,442,507 A | * | 8/1995 | Koga et al. ................. | 360/113 |
| 5,568,335 A | * | 10/1996 | Fontana et al. ............. | 360/113 |
| 5,847,904 A | * | 12/1998 | Bharthulwar ............... | 360/322 |
| 5,867,350 A | * | 2/1999 | Haga et al. ................. | 360/128 |
| 5,880,910 A | * | 3/1999 | Shouji et al. ............... | 360/113 |
| 5,883,764 A | * | 3/1999 | Pinarbasi .................... | 360/113 |
| 5,894,375 A | * | 4/1999 | Kanda ....................... | 360/77.02 |
| 5,946,167 A | * | 8/1999 | Hara et al. .................. | 360/113 |
| 5,966,272 A | * | 10/1999 | Cain .......................... | 360/113 |
| 5,992,004 A | * | 11/1999 | Sato et al. ................. | 29/603.14 |
| 6,111,722 A | * | 8/2000 | Fukuzawa et al. .......... | 360/113 |
| 6,118,624 A | * | 9/2000 | Fukuzawa et al. .......... | 360/113 |
| 6,120,920 A | * | 9/2000 | Takada et al. .............. | 428/693 |
| 6,185,078 B1 | * | 2/2001 | Lin et al. ................... | 360/324.1 |
| 6,198,378 B1 | * | 3/2001 | Saito et al. ................. | 338/32 R |
| 6,198,608 B1 | * | 3/2001 | Hong et al. ................. | 360/320 |
| 6,215,630 B1 | * | 4/2001 | Schultz et al. .............. | 360/113 |
| 6,324,037 B1 | * | 11/2001 | Zhu et al. ................... | 360/324.12 |

* cited by examiner

Primary Examiner—Hoa T. Nguyen
Assistant Examiner—Dzung C. Nguyen
(74) Attorney, Agent, or Firm—Pillsbury Winthrop LLP

(57) ABSTRACT

A magnetoresistive (MR) head device is used as the read head of a disk drive. The magnetoresistive head device is provided with a magnetoresistive layer and conductors. The magnetoresistive layer changes in magnetization direction in response to a recording magnetic field on a disk. The conductors serve as electrodes and used for supplying a sense current to the magnetoresistive layer. The conductors have joint portions that are in contact with the magnetoresistive layer. The joint portions have substantially the same height (thickness) as the magnetoresistive layer, if it is measured from the disk surface. With this structure, a sense current supplied from one of the conductors flows through the magnetoresistive layer in a uniform direction. Hence, the magnetization direction is constant throughout the magnetoresistive layer.

6 Claims, 5 Drawing Sheets

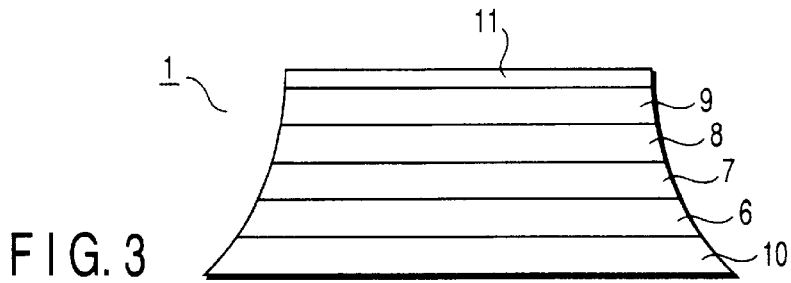
FIG. 3
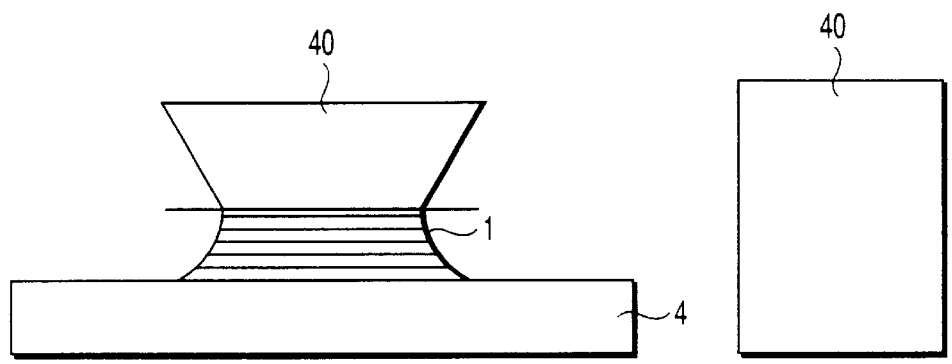
FIG. 4A  FIG. 4B
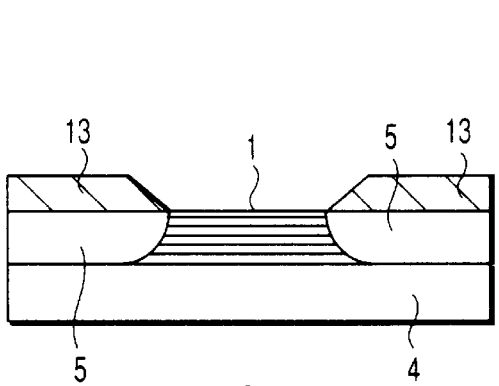 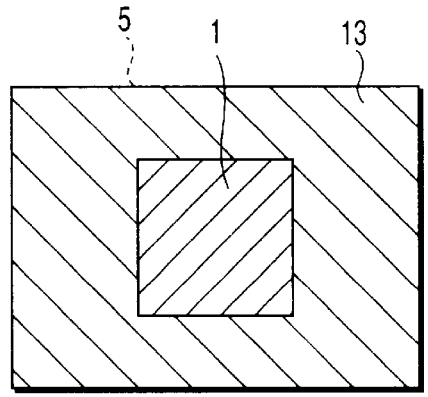
FIG. 5A  FIG. 5B
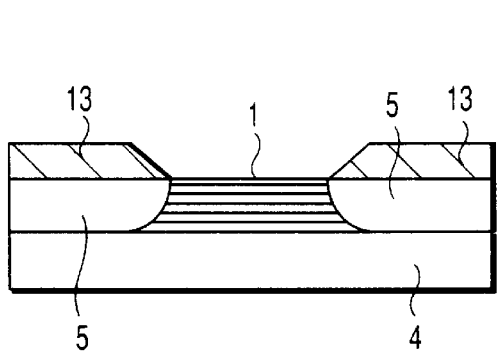 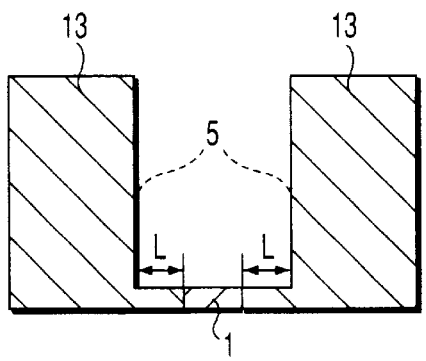
FIG. 6A  FIG. 6B

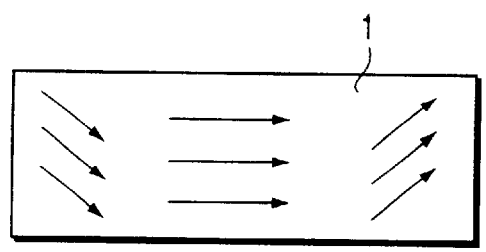
FIG. 11 PRIOR ART
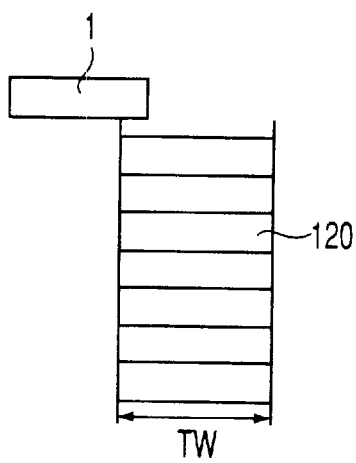 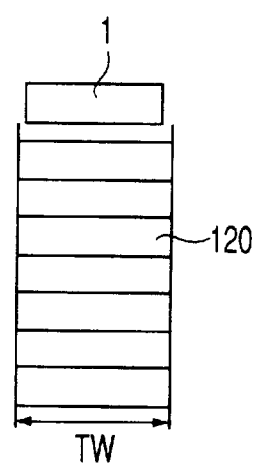 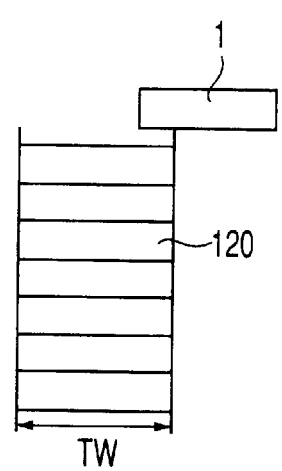
FIG. 12A PRIOR ART   FIG. 12B PRIOR ART   FIG. 12C PRIOR ART
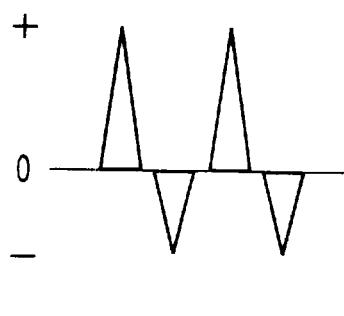 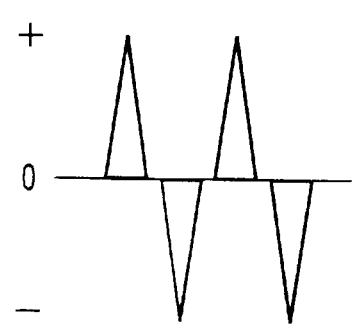 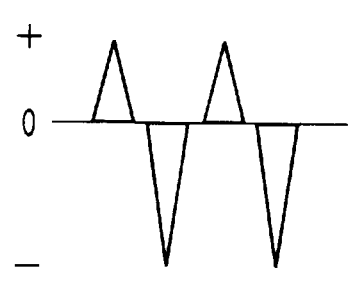
FIG. 13A PRIOR ART   FIG. 13B PRIOR ART   FIG. 13C PRIOR ART

MAGNETORESISTIVE HEAD DEVICE INCORPORATING JOINTS BETWEEN MAGNETORESISTIVE LAYER AND SENSE CURRENT CONDUCTORS

CROSS-REFERENCE TO RELATED APPLICATION

This application is based upon and claims the benefit of priority from the prior Japanese Patent Application No. 11-246165, filed Aug. 31, 1999, the entire contents of which are incorporated herein by reference.

BACKGROUND OF THE INVENTION

The present invention relates to a head device applied, for example, to the read head of a disk drive. More particularly, the invention relates to a magnetoresistive head device employing a giant magnetoresistive (GMR) device (sensor).

In recent years, disk drives, such as hard disk drives (HDD), have employed a magnetoresistive head (an MR head) as a read head for reading out data magnetically recorded in a disk (i.e., a recording medium). Nowadays, it has become mainstream to use an characteristics-improved GMR element (such as a spin-valve sensor) as the MR head.

Normally, an HDD comprises a magnetic head device wherein a read head made of a GMR element and a write head made of an interactive thin film head are mounted on the same slider.

FIG. 9 is a conceptual diagram of a conventional GMR element and shows how the GMR element formed on a wafer looks like when viewed from above. A GMR layer 1, exhibiting a magnetoresistive effect, joins electrode films (conductors) 90 at the respective ends. The electrode films 90 serve to cause a current flow. FIG. 10 shows a sense current (broken-line arrows 100) which flows from one of the electrode films 90 to the other through the GMR layer 1. The sense current produces a magnetic field 101 acting in the direction indicated by the solid-line arrows.

It should be noted that the electrode films 90 are very high at the joint 91 where they are in contact with the GMR film 1 (the height being regarded as the width if viewed in the Z direction indicated in FIG. 9). Due to this structure, the direction in which the sense current flows varies at the joint 91. As shown in FIG. 10, therefore, the sense current (100) flowing down in the left electrode film 90 begins to flow horizontally when it reaches the joint 91 that adjoins the GMR film 1. Having passed through the GMR film 1, the sense current enters the opposing (right) electrode film 90, where it changes in direction and flows again vertically.

Since the sense current changes in direction in this manner, the direction in which the generated magnetic field acts differs between the central part of the GMR film 1 and the end portions thereof (i.e., the portions in the neighborhood of the joints 91), as indicated in FIG. 11.

In the conventional GMR head, the electrode films 90, with which the sense current is made to flow in the GMR layer 1, have a greater height the height being regarded as the width if viewed in the Z direction indicated in FIG. 1 than that the GMR layer 1 has at the joints, as described above. Due to this structure, the direction in which the sense current flows changes markedly in the neighborhood of the joints. As a result, the direction in which a free layer (i.e., an MR active region used for a reproducing magnetic field) included in the GMR layer 1 is magnetized differs, depending upon the portions of the GMR layer. The magnetization differs between the central portion of the GMR layer and the end portions thereof (the portions in the neighborhood of the joints).

This gives rise to the following problems.

FIGS. 12A to 12C show how the position of the read head of a HDD is related to a data track 120 (the track width of which is TW) of a disk (recording medium) when data (servo data or user data) are read out from the data track by the GMR element 1 of the read head. As shown in FIG. 12B, when the read head (GMR element 1) is located within the range of the data track 120, the amplitudes of positive and negative pulses of the signals read by the read head are substantially equivalent or symmetric (see FIG. 13B).

As shown in FIGS. 12A and 12C, when the read head is shifted from the data track in the widthwise direction of the track (this state will be hereinafter referred to an "offtrack" state, the amplitudes of the positive and negative pulses of the read signals are asymmetrical. (See FIGS. 13A and 13C.) This phenomenon is attributed to the above-described magnetization direction of the free layer 1 included in the GMR layer 1. That is, the direction in which the free layer is magnetized differs between the central portion of the GMR layer and the end portions thereof (see FIG. 11). If the distribution of the magnetic layer of the GMR layer 1 is in this state, the magnetization is discontinuous in the magnetic domain structure of the free layer. This is considered to cause so-called Barkhausen noise.

Where the amplitudes of the positive and negative pulses of the read signal vary depending upon the position of the read head, as shown in FIGS. 13A and 13C, the servo data, with which the positioning of the head is controlled, may not be reproduced with high accuracy. Since this increases the positional shift of the head, the data reproduction operation, i.e., the operation for reproducing recorded signals from the disk, may not be performed with high accuracy. This problem is very serious if the data track width of a disk is decreased for high-density recording.

BRIEF SUMMARY OF THE INVENTION

An object of the present invention is to enable an MR layer to be magnetized uniformly when a sense current flows. When the MR layer having this characteristic is incorporated in the read head, the amplitudes of the positive and negative pulses of a read signal do not become asymmetric, and the generation of Barkhausen noise is suppressed.

To attain this object, the present invention provides a magnetoresistive head device comprising: a magnetoresistive layer which exhibits different resistances in accordance with a magnetization direction corresponding to a magnetic field applied from a magnetic recording medium and a current flow direction of a sense current; and electrode sections (conductors) sandwiching the magnetoresistive layer in contact therewith and causing the sense current to flow. The electrode sections has joint portions which are in contact with the magnetoresistive layer, and these joint portions have substantially the same height as that of the magnetoresistive layer when measured from the surface of the magnetic recording medium (disk). The magnetoresistive layer is specifically a giant magnetoresistive (GMR) element (sensor) and includes a free layer. The free layer is an MR active region for detecting the recording magnetic field on the disk.

With this structure, the present invention enables the magnetization direction associated with a sense current to be as uniform as possible throughout the length of the free layer of the GMR layer, i.e., from the end portions in contact with the electrode sections to the central portion. Hence, when the MR head of the present invention is employed as the read head of a disk drive, stable read signals can be reproduced from the read head. More specifically, even when the read head is away from the target data track of a disk and is therefore in the offtrack state, the amplitudes of the positive and negative pulses of the read signal from the head can be controlled to be constant. In addition, it is possible to suppress the Barkhausen noise, which is due to the generation of a magnetic domain in the GMR layer. Owing to this feature, the read head can reproduce servo data, required for the positioning control of the head, from the disk with high accuracy. Consequently, the read error rate can be improved when data are read from the disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows the GMR layer of the MR head of the embodiment;

FIGS. 4A, 4B, 5A, 5B, 6A and 6B illustrate the manufacturing process of the GMR head of the embodiment;

FIG. 11 shows how the magnetization direction is in the conventional GMR element;

FIGS. 12A to 12C shows the positional relationship between data tracks and a read head that is made of the conventional GMR head; and FIGS. 13A to 13C shows how the position of the conventional read head is related to a read signal.

DETAILED DESCRIPTION OF THE INVENTION

An embodiment of the present invention will now be described with reference to the accompanying drawings.
(Structure of GMR Head)

Figure 1:
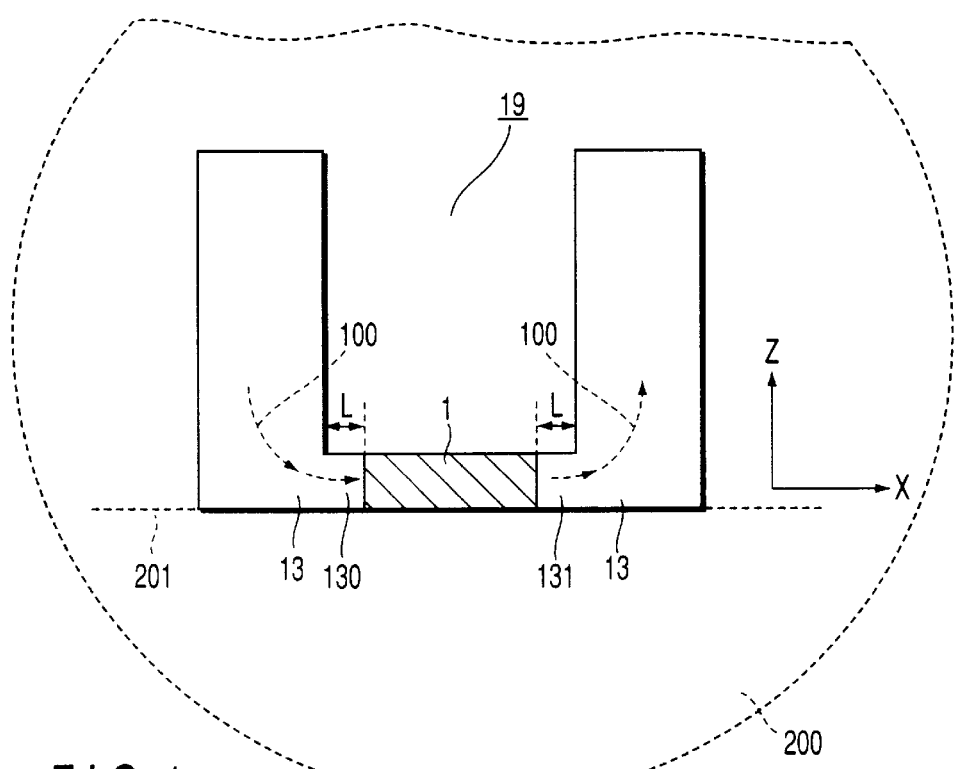
FIG. 1 shows the major portion of an MR head according to one embodiment of the present invention.
Figure 2:
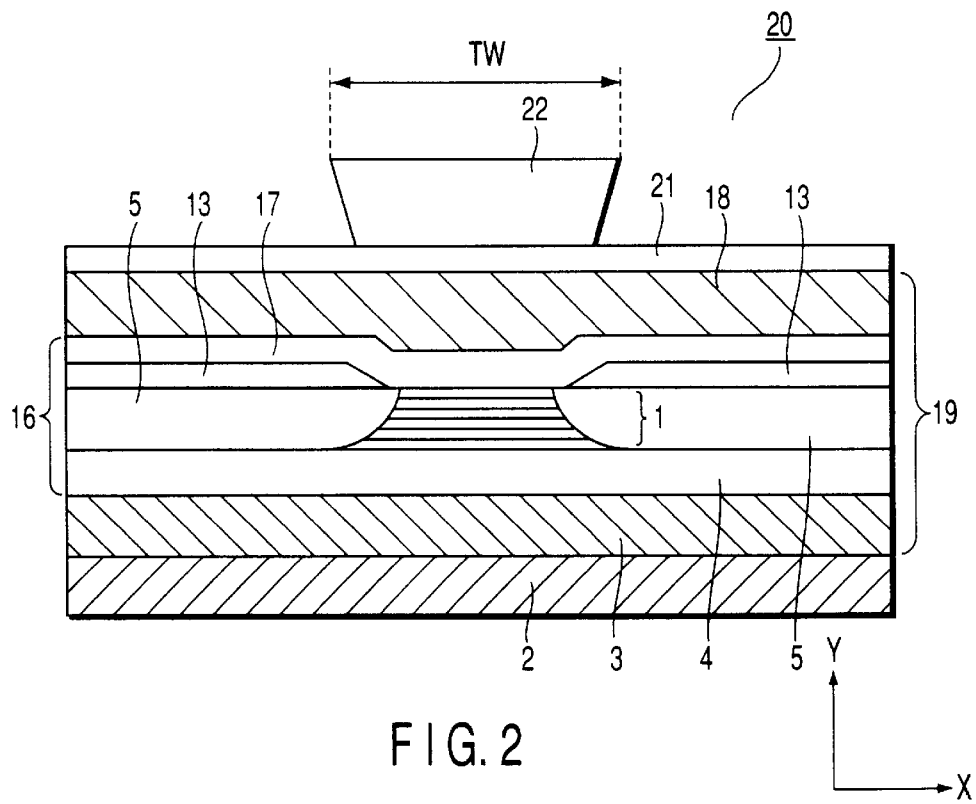
FIG. 2 shows the MR head of the embodiment.

FIG. 1 shows the upper side of a wafer 200 on which an MR head 19 according to the embodiment is formed. The MR head 19 of the embodiment is used as the read head of a disk drive (HDD). In the magnetic head apparatus of an actual HDD, a read head and a write head 20 are mounted on a slider (see FIG. 2). FIG. 2 shows how the MR head 19 looks when viewed in the direction (Z direction) of a disk surface 201. In FIGS. 1 and 2, the X direction is the direction of the width (TW) of a data track on a disk, and the Y direction is the direction in which the data track moves (i.e., the rotating direction of the disk).

As shown in FIG. 2, the MR head of the embodiment is provided with a substrate made of an alumina layer (which is actually an $Al_2O_3 \cdot TiC$ substrate). On this substrate, a lower magnetic shield layer 3 and a lower magnetic gap 4 are stacked. The lower magnetic shield layer 3 is formed of a soft magnetic material, such as a NiFe (nickel·iron) alloy, a FeSiAl (iron·silicon·aluminum) alloy, and an amorphous (CoZrNb) alloy. The lower magnetic gap 4 is formed of a nonmagnetic material, such as alumina ($Al_2O_3$).

Arranged on the lower magnetic gap 4 are: a magnetoresistive layer (hereinafter referred to as a GMR layer) which functions as a GMR element (or a GMR sensor); a pair of bias films (bias elements) 5 spaced by a predetermined distance; and a pair of electrode films (conductors) 13 also spaced by a predetermined distance. The bias films (bias elements) 5 serve to apply a bias magnetic field to the GMR layer 1.

The GMR layer 1 is a spin-valve element (sensor).

As shown in FIG. 3, this element is a magnetic multi-layered film made up of: a base layer 10; a free layer 6 (i.e., an MR active region used for detecting a magnetic field) which changes in magnetization direction in response to an external magnetic field (i.e., a recording magnetic field on a disk); a nonmagnetic layer 7; a magnetically fixing layer (pinning layer) 8; and an antiferromagnetic layer 9. These elements are stacked on the base layer 10 in the order mentioned. The antiferromagnetic layer 9 is overlaid with a protective layer 11. This protective layer 11 is formed of tantalum (Ta), titan (Ti) or the like, and the provision of the protective layer 11 is an option. The free layer 6 includes a ferromagnetic layer containing cobalt (Co), such as a CoFe (cobalt·iron) alloy layer. The nonmagnetic layer 7 is located on the cobalt-containing ferromagnetic layer of the free layer 6. The free layer 6 may be, for example, an NiFe (nickel·iron) alloy consisting of 80% of nickel (Ni) and 20% of iron (Fe).

The pinning layer 8 is located above the free layer 6, with the nonmagnetic layer 7 interposed. The nonmagnetic layer 7 is formed of copper (Cu), gold (Au), silver (Ag), or an alloy of these. Like the free layer 6, the pinning layer 8 is formed of a cobalt-containing ferromagnetic material. It is formed of a CoFe (cobalt·iron) alloy. The antiferromagnetic layer 9 is formed of a PtMn (platinum·manganese) alloy, an IrMn(iridium·manganese) alloy, an FeMn (iron·manganese) alloy, an NiMn (nickel·manganese) alloy, or the like. The pinning layer 8 is magnetically fixed to the antiferromagnetic layer 9 by exchange coupling thereto.

The GMR layer 1 (spin-valve sensor), which is a multi-layered film, as described above, is shaped by removing the outer ends that are located outside the range of the recording track width by etching, for example. The GMR layer 1 have their outer ends removed in such a manner that the resultant structure conforms with the shape of the free layer 6, which detects an external magnetic field, such as a recording magnetic field on a disk. In other words, the GMR layer 1 is shaped such that its X-direction length is equal to the desired track width (TW). The paired bias films 5, by which a bias magnetic field is applied to the GMR layer 1, are arranged on the outer sides of the ends (edges) of the GMR layer 1, thereby forming a so-called abutted joint. The bias films 5 are made of: a hard magnetic film, such as a cobalt-platinum (CoPt) alloy; an antiferromagnetic film, such as a nickel-manganese (NiMn) alloy, an iron-manganese (FeMn) alloy, an iridium-manganese (IrMn) alloy, or a platinum-manganese (PtMn) alloy; a laminated film made up of a soft magnetic film and a hard magnetic film; a laminated film made up of an antiferromagnetic film and a soft magnetic film; or the like.

The bias films 5 are overlaid with the paired electrode sections (conductors) 13, which are formed of copper (Cu), gold (Au), zirconium (Zr), tantalum (Ta), tungsten (W), or the like. By the paired electrode sections 13, a sense current is made to flow through the GMR layer 1. The GMR layer 1, the paired bias film 5, the paired electrode sections 13, the lower magnetic gap 4 and an upper magnetic gap 17 jointly constitute a GMR device 16.

An upper magnetic shield layer 18 is formed above the GMR device 16, with the upper magnetic gap 17 interposed. The upper magnetic gap 17 is formed of a nonmagnetic insulating material similar to that of the lower magnetic gap 4. The upper magnetic shield layer 18 is formed of a soft magnetic material similar to that of the lower magnetic shield layer 3. These elements constitute a shield type GMR head 19 together with the lower magnetic shield layer 3.

The shield type GMR head 19 is overlaid with a write head 20, which is an induction type thin-film head. The write head 20 is made up of: a lower recording magnetic pole 17, which also serves as the upper magnetic shield layer; an upper recording magnetic pole 22, and a recording magnetic gap 21. The recording magnetic gap 21 is formed of a nonmagnetic insulating material, such as aluminum oxide (AlOx). A recording coil (not shown), used for applying a recording magnetic field to both the lower recording magnetic pole 17 and the upper recording magnetic pole 22, is arranged behind the disk-opposing surface.

In the GMR head described above, the paired electrode sections (conductors) 13 join the end portions of the GMR layer 1. It should be noted that FIG. 1 shows how the wafer surface 200 looks when viewed from above. That is, FIG. 1 does not illustrate the bias layers 5 since these layers are located under the electrode sections 13.

The electrode sections 13 have joint portions 130 and 131 (ranges L) which are in contact with the GMR layer 1. The joint portions 130 and 131 have substantially the same height as the GMR layer 1 when measured from the surface 201 of the disk (the height being the thickness as measured in the Z direction). The ranges L have an upper limit since they provide a high electric resistance with reference to the wide portions of the electrode sections 13. Likewise, the ranges L have a lower limit since they have to be determined in consideration of the amount of sense current flowing therethrough and the height of the GMR layer 1. When the sense current is, for example, 5 mA or thereabouts, the ranges L are desirably set to be 0.5 µm or so in consideration of an alignment error of a stepper used when the head is manufactured.

(Operation of GMR Layer)

A description will now be given of the direction of the magnetic field that is generated in the free layer when a sense current is made to flow through the GMR layer 1 from one of the electrode sections 13 to the other.

As shown in FIG. 1, the sense current 100 from one electrode section 13 flows in the vertical direction and then in the horizontal direction (i.e., the direction in which the GMR layer 1 extends). Since the joint portion 130 (range L) of the electrode section 13 has substantially the same height as the GMR layer 1, the sense current does not change its direction when flowing from the joint portion 130 to the GMR layer 1. As a result, the free layer (layer 6 shown in FIG. 3) included in the GMR layer 1 is applied with a magnetic field resulting from the sense current flow. Hence, the direction of the magnetic field is constant at any portions of the free layer, including the central portion and the end portion (i.e., portion adjoining the joint portion 130).

When the sense current 100 flows from the GMR layer 1 to the electrode section 13, it changes its flow direction from horizontal to vertical. Since the joint portion 131 (range L) of the electrode section 13 has substantially the same height as the GMR layer 1, the sense current does not change its direction when flowing from the GMR layer 1 to the joint portion 131. As a result, the direction of the magnetic field is constant at any portions of the free layer, including the central portion and the end portion (i.e., portion adjoining the joint portion 131).

As described above, the GMR device 16 of the embodiment is featured in that the sense current supplied from the electrode section 13 to the GMR layer 1 flows substantially in the same direction throughout the GMR layer 1. Since the sense current flows uniformly, the magnetic field induced thereby applies to the free layer 6 of the GMR layer 1 substantially in the same direction without reference to the locations of the free layer 6.

Even if the read head of the embodiment is away from the target data track on the disk and is in the offtrack state, a read signal (e.g., servo data) output from the read head is substantially constant with respect to the amplitude values of its positive and negative pulses (see FIG. 13B). Owing to this feature, when the positioning of the magnetic head (i.e., the slider on which the read and write heads are mounted) is controlled by use of a read signal (servo data) output from the read head, the positioning accuracy is prevented from lowering. Since the margin of a read error rate, which is dependent on the positioning accuracy of the head, can be improved, data can be reproduced with high efficiency even from a high-density recording disk.

(Manufacturing Process)

A description will now be given of the manufacturing process of the GMR device 16 of the embodiment with reference to FIGS. 4A, 4B, 5A, 5B, 6A and 6B. FIGS. 4A, 5A and 6A are cross sectional views as viewed from the disk surface, and FIGS. 4B, 5B and 6B are views as viewed from the wafer surface.

First of all, a GMR layer 1 (a spin-valve sensor) is formed on the surface of a magnetic gap film 4, as shown in FIG. 4a. The lower magnetic gap film 4 is formed of a nonmagnetic material, such as aluminum oxide. Then, a photoresist 40 is formed to control the GMR layer 1 to have a predetermined width. By use of this photoresist 40, patterning processing is executed in the ion milling method or the like. Since the photoresist 40 is used again in liftoff processing performed later, it is left unremoved (see FIG. 4B). Since the liftoff processing is performed later, it is desirable that the photoresist 40 have an inversely tapered cross section. In other words, the upper surface of the resist 40 desirably has a wider area than that of the bottom surface.

As shown in FIG. 5A, a bias film 5 and an electrode section 13 are successively formed on the surface of the lower magnetic gap film 4. By use of the photoresist 40 employed in the patterning processing of the GMR layer 1, the liftoff processing is executed for patterning (see FIG. 5B). It should be noted that the bias film 5 is not illustrated in FIG. 5B since it is located under the electrode section 13.

As shown in FIG. 6A, the height of the GMR layer 1, the bias film 5 and the electrode section 13 are patterned by forming a photoresist (not shown) and executing patterning processing using the photoresist (see FIG. 6B). In FIG. 6B, the bias film 5 is not seen since it is located under the electrode section 13. The bias film 5 and the electrode section 13 have portions which will have the same height as the GMR layer 1, and the length (L) of such portions is determined in consideration of an alignment error which may occur when the photoresist is exposed to light.

By the manufacturing process described above, the GMR layer 1 and the electrode section 13 having joint portions (130, 131) of the same height as the GMR layer 1, are formed. In the shield type GMR head 19, the bias film 5 and the electrode section 13 also have portions which adjoin the GMR film 1 and have the same height as the GMR layer 1. Hence, the direction in which a current flows through the GMR layer 1 does not vary throughout the length, including the portions close to the joint portion and the central portion. This being so, the direction of the magnetic field inducted by the current is constant throughout the length of the GMR layer 1. Since the current-induced magnetic field is applied to each portion of the GMR layer 1 in the same direction, the free layer 6 can be magnetized in a uniform manner. Even if the read head is away from the target data track on the disk and is therefore in the offtrack state, a read signal (e.g., servo data) is substantially constant with respect to the amplitude values of its positive and negative pulses.

The embodiment described above provides a so-called abutted junction structure, wherein the bias film 5 and the electrode section 13 are located at each end of the GMR layer 1. The present invention is applicable to a so-called read overlaid structure, wherein the distance between electrode sections 13 determines a reproduction data track width. Of these two types, the former abutted joint structure is preferable. This is because the current-induced magnetic field applied to the free layer 6 is different in intensity depending upon portions of the GMR layer 1. That is, the intensity that the magnetic field has where the electrode section 13 overlaps with the GMR layer 1 is different from the intensity that the magnetic field has in the central portion of the GMR layer 1.

The GMR layer 1 and the joint portions 130 and 131 of the electrode sections 13 need not be exactly the same in height; they may be slightly different in height. Even with this structure, the current-induced magnetic field flows through the GMR layer 1 in a uniform direction. However, since the tracks along which the head moves are narrow recently, the sensitivity of the GMR layer 1, i.e., the direction in which the free layer 6 is magnetized, is likely to vary in response to an external magnetic field (a recording magnetic field on a disk). Hence, the current-induced magnetic field is likely to vary in response to the external magnetic field. In consideration of this, it is desirable that the joint portions 130 and 131 of the electrode sections 13 and the GMR layer 1 have substantially the same height (thickness). The same-height structure is advantageous particularly in the case where a disk has a narrow track width (a high density of tracks), i.e., where the width of a data track on the disk is 1 $\mu$m or less.

(Modification)

The embodiment described above pertains to a structure wherein the electrode sections have optimally-shaped joint portions (130, 131) which enable the uniform magnetization direction at any portions of the free layer 6 of the GMR layer, including the central and end portions.

Figure 7:
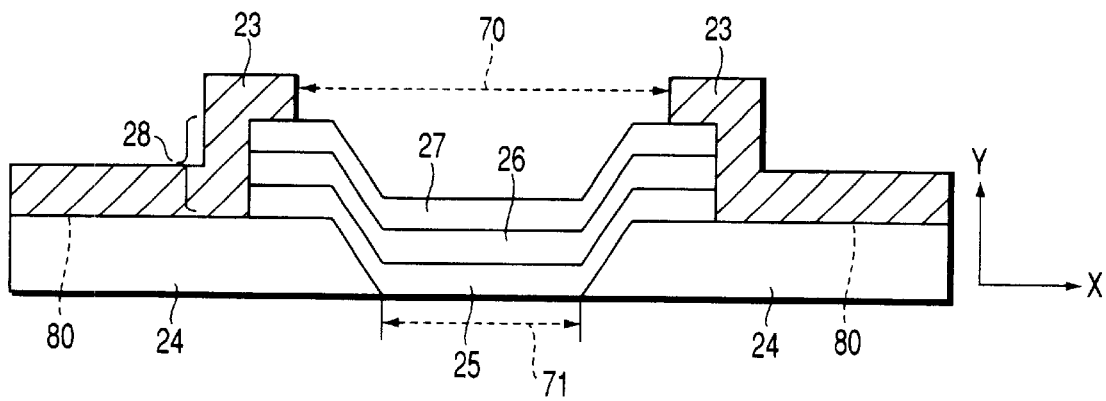
FIG. 7 shows the major portion of a GMR head according to a modification of the embodiment.

FIG. 7 shows a modification of the embodiment. According to this modification, the portion where the magnetic field induced by a sense current varies in direction is rendered magnetically insensitive to a signal magnetic field from a disk (i.e., magnetically recorded data). With this characteristic, even if the read head is off the target track (in the offtrack state), it is possible to suppress the variation in the amplitudes of the positive and negative pulses of a read signal.

FIG. 7 is a cross sectional view showing how a GMR device 16 looks like when viewed from the disk surface. In FIG. 7, the X direction is the widthwise direction of a data track on a disk, and the Y direction is the direction in which the data track moves (i.e., the rotating direction of the disk).

The GMR device according to the modification comprises bias elements (magnetic field-applying films) 24, a GMR layer 28 and electrode sections 23. The spacing (70) between the electrode section 23 is greater than that (71) between the bias elements 24. As described later, the bias elements 24 are covered with an insulating oxide film (80), and this film prevents a sense current supplied from the electrode sections 23 from flowing to the bias elements 24. In place of this structure, the bias elements 24 may be formed of a high resistance material, such as nickel oxide (NiO). The bias elements 24 formed of such a material do not allow a sense current to pass therethrough.

The GMR layer 28 constitutes a spin-valve sensor similar to that of the GMR layer 1 of the embodiment described above. The GMR layer 28 comprises a free layer 25 (i.e., a layer for detecting a magnetic field), a nonmagnetic interlayer 26 (corresponding to the nonmagnetic layer 7), a pinning layer 27, and a protective layer (not shown).

A description will now be given of the manufacturing process of the GMR device of the modification with reference to FIGS. 8A to 8C.

Figure 8A:
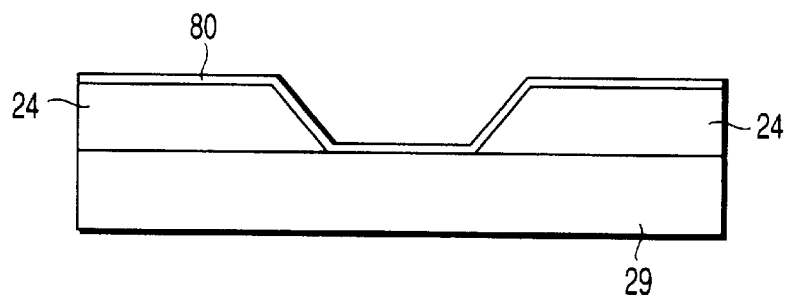
FIGS. 8A to 8C illustrate the manufacturing process of the GMR head of the modification.
Figure 8B:
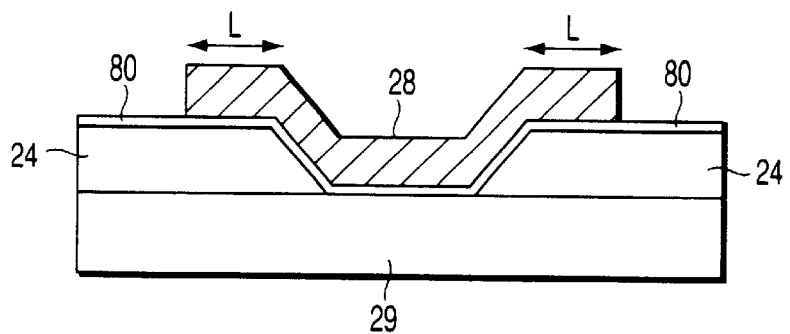

As shown in FIG. 8A, bias elements 24 are formed on a lower magnetic gap 29, which is formed of aluminum oxide (AlOx), for example. Then, patterning processing is executed in the ion milling method until the distance between the bias elements 24 becomes a predetermined width, e.g., 1 $\mu$m. The milling is executed in such a manner that the angle of the internal edge of each bias element is equal to 90° or less. The angle of the internal edges of the bias elements 24 can be controlled to be an arbitrary value by changing the angle at which ion beams are applied for milling. There are two reasons for controlling the angle of the internal edge of each bias element 24 to be 90° or less. One of the reasons is that a GMR layer 28, which is to be formed on each bias element 24, is prevented from being disconnected at the position corresponding to the corner of each bias element 24. The other reason is that an upper reproduction shield and the GMR film can be reliably insulated.

The bias elements 24 are formed of a high resistance material, such as nickel oxide (NiO). Alternatively, an insulating oxide film 80 (formed of an insulating material, such as AlOx or SiOx) is formed on the surface of the ferromagnetic layer. Owing to this structure, a sense current is prevented from flowing into the bias elements 24. If each bias element 24 is made of a hard magnetic film; a laminated film made up of a soft magnetic film and a hard magnetic film; or a laminated film made up of an antiferromagnetic film and a hard magnetic film, the resistance of the bias element 24 is inevitably high. In this case, therefore, the insulating oxide film 80 is formed after the patterning process.

Subsequently, a GMR layer 28 is formed on the bias elements 24. To be more specific, a free layer 25 (i.e., a layer for detecting a magnetic field), a nonmagnetic interlayer 26, a pinning layer 27, and a protective layer are successively formed, and patterning processing is executed in the ion milling method or the like, as in the embodiment described above. The end portions of the GMR layer 28 are controlled to overlap with the bias elements 24. The length L of the overlapping end portions should be preferably 0.5 μm or greater in consideration of alignment error which may occur when an electrode film is formed later.

Figure 8C:
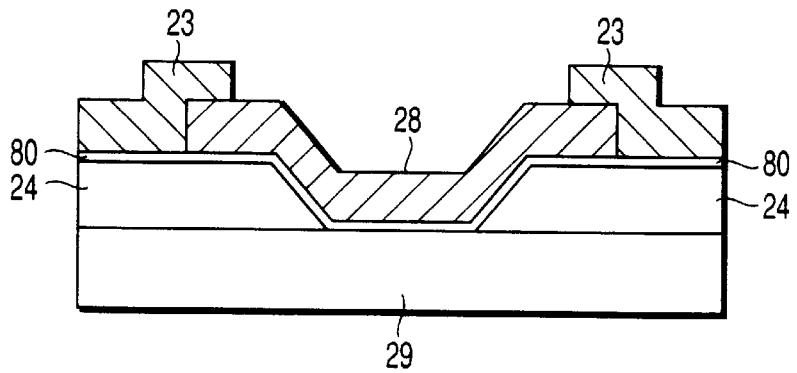
Figure 9:
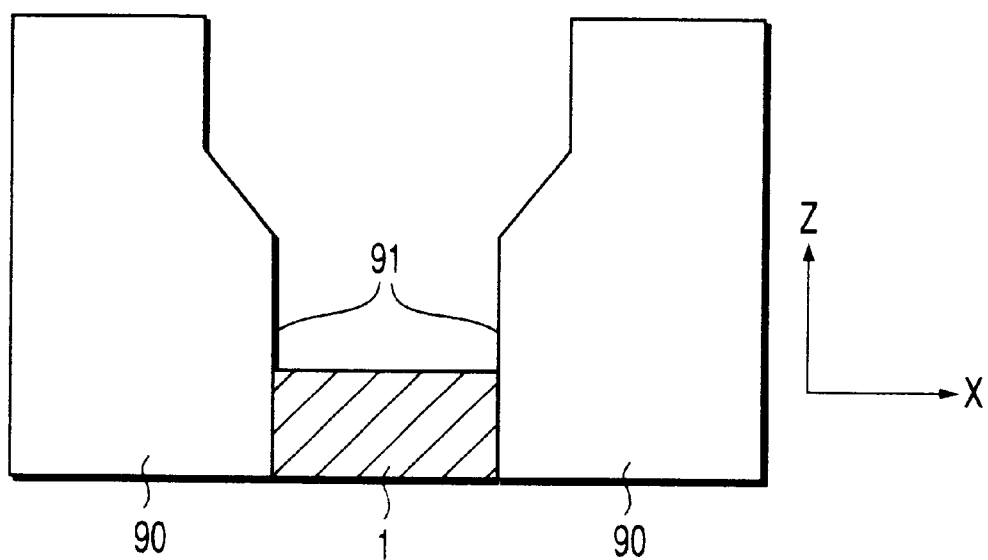
FIG. 9 shows a conventional GMR element.
Figure 10:
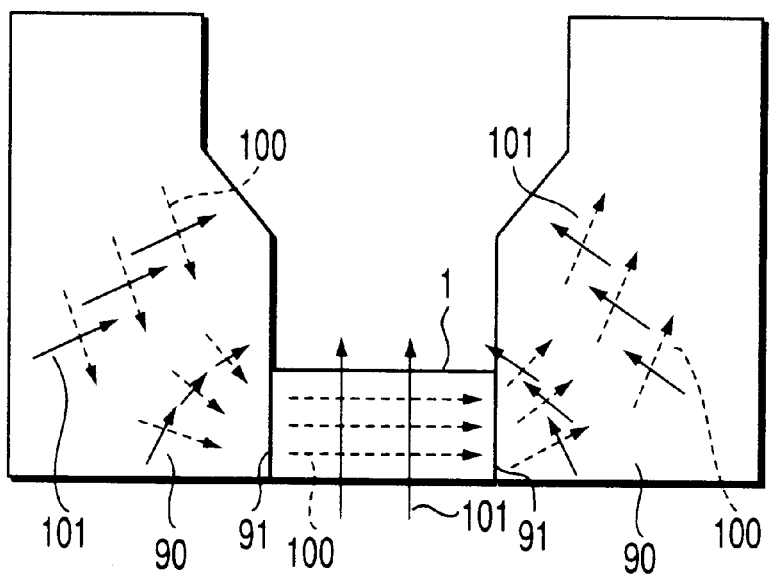
FIG. 10 shows how the direction of a sense current and the magnetic field direction are related in the conventional GMR element.

Electrode sections (conductors) 23 are formed in the manner shown in FIG. 8C. The electrode sections 23 are formed of copper (Cu), gold (Au), zirconium (Zr), tantalum (Ta), titanium (Ti), or an alloy of these. The electrode sections 23 are patterned by the ion milling method. In this manner, it is possible to form a GMR device wherein the distance between the bias elements 24 is shorter than that between the electrode sections 23 and wherein the bias elements 24 define a reproduction track width.

As in the embodiment described above, the GMR device is overlaid with an upper reproduction gap film, a lower recording magnetic pole also serving as an upper reproduction shield, a recording coil, and an upper recording magnetic pole. As a result, a read/write separation type magnetic head is formed. Instead of forming the insulating oxide film 80 on the bias elements 24, the GMR layer 28 may be formed of an antiferromagnetic oxide film having a high electric resistance. In this case, the GMR layer 28 can be formed directly. It should also be noted that the opposing end portions of the bias elements 24 may be inclined at an angle of 90° or less.

In the GMR device described above, a sense current is supplied to the GMR layer 28 from one of the electrode sections 23. The reproduction track width of the read head incorporating the GMR device depends upon the distance between the distance between the bias elements 24. The bias magnetic field induced by the sense current magnetizes the free layer 25, and the direction in which the free layer 25 is magnetized differs in the central portion of the GMR layer 28 and the portions that are neighborhood of the electrode sections 23.

It should be noted that the bias elements 24 are located under the free layer 25. Therefore, when the free layer 25 is magnetized by the bias magnetic field, the magnetization of the free layer 25 is not varied by a signal magnetic field from a disk (i.e., magnetically recorded data). In other words, only those portions of the free layer 25 that are located between the bias elements 24 vary in magnetization direction in response to a signal recording field from a disk and thus take part in the reproduction operation. As described above, those portions of the free layer 25 are magnetized in the same direction since they are not under the influence of the current-induced magnetic field. Even when the read head is away from the target track and is therefore in the offtrack state, the amplitude ratio of the positive and negative pulses of a reproduction signal remains unchanged. Hence, the error rate is little affected even if the read head is shifted from the target position during data reproduction, and a wide margin can be expected in regard to a positional error.

According to the modification, the distance between the bias elements 24 is narrower than that between the electrode section 23. Due to this structure, the end portions of the bias elements 24 are located on the inner side of the end portions of the electrode sections 23. Since those portions of the free layer 25 which are located neighborhood of the bias elements 24 are under the strong influence of the bias magnetic field, the portions in questions are not insensitive to the signal magnetic field applied from the disk. It can be seen from this that the reproduction track width can be controlled by adjusting the distance between the bias elements 24. In actuality, however, the reproduction track width is less than the distance between the bias elements 24 by 0.1 μm or so.

In the read head according to the modification described above, the distance between the bias elements is long, and an insulating oxide film is formed on the bias elements. With this structure, a sense current does not flow into the predetermined portions of the free layer, and the portions in questions are therefore magnetically insensitive. In other words, only the central portion of the free layer of the GMR layer contributes to the read operation. The end portions of the free layer (i.e., joint portions in contact with the electrode sections), which could be magnetized in a different direction from that of the central portion by a sense current, do not take part in the read operation. This is why the distance between the electrode sections, which are used for supplying a sense current, can be longer than the distance between the bias elements (bias magnetic field-applying films).

Owing to the above structure, the direction in which the free layer is magnetized by a sense current can bee controlled to be constant throughout the length of the free layer. Those portions of the free layer which do not take part in the read operation are used as a current path, while those portions of the free layer which are influenced by a current-induced magnetic field are made magnetically insensitive by the bias elements. Consequently, the direction in which the free layer is magnetized by a sense current is made uniform, and the generation of Barkhausen noise in the free layer can also be suppressed as well.

As detailed above, a read head incorporating a GMR device according to the present invention is advantageous in that the GMR layer can be uniformly magnetized by a sense current. Hence, the generation of Barkhausen noise can be suppressed, and the amplitude ratio of the positive and negative pulses of a signal read from the read head can be constant. Consequently, therefore, the read error rate can be improved. The read head of the present invention is useful particularly when it is applied to a disk drive designed for high recording density.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetoresistive head device comprising:

a magnetoresistive layer which exhibits different resistances in accordance with a magnetization direction corresponding to a magnetic field applied from a magnetic recording medium and a current flow direction of a sense current; and conductors sandwiching the magnetoresistive layer in contact therewith and causing the sense current to flow, said conductors having joint portions which are in contact with the magnetoresistive layer and which are substantially equal in height to the magnetoresistive layer when measured from a surface of the magnetic recording medium, said joint portions being projected portions of said conductors and causing the sense current to flow in the same direction as the sense current flow direction of the magnetoresistive layer.

2. A magnetoresistive head device according to claim 1, further comprising:

a bias element, arranged to form a flat surface with reference to the magnetoresistive layer, for applying a bias magnetic field to the magnetoresistive layer.

3. The magnetoresistive head device according to claim 1, further comprising:

a bias element for applying a bias magnetic field to the magnetoresistive layer, said conductors and said bias element constituting a magnetoresistive element of an abutted-junction structure wherein said conductors and said bias element join each other, said magnetoresistive element being located at each end of the magnetoresistive layer.

4. The magnetoresistive head device according to claim 1, which is for use as a read head in a disk drive, said disk drive comprising:

a disk for storing data; and a magnetic head device including a write head as well as the read head, said magnetic head device controlling the read head to read the data from the disk, said write head being used for writing the data in the disk.

5. The magnetoresistive head device according to claim 1, wherein said magnetoresistive layer includes a free layer which exhibits different resistances in accordance with a magnetization direction corresponding to a magnetic field applied from magnetically recorded data in the magnetic recording medium and the current flow direction of the sense current.

6. The magnetoresistive head device according to claim 1, wherein said magnetoresistive layer includes: a free layer which changes in magnetization direction in response to an external magnetic field; a nonmagnetic layer formed on the free layer; and a pinning layer, wherein the sense current flowing from one of the conductors to the free layer is controlled to flow in a uniform manner, thereby permitting a magnetization direction associated with the sense current to remain unchanged throughout the free layer.

* * * * *